(12) United States Patent  
Cousin et al.

(10) Patent No.: US 8,404,290 B2  
(45) Date of Patent: Mar. 26, 2013

(54) METHOD FOR SHAPING A FOOD PRODUCT BY CRYOEXTRUSION EMPLOYING PREDICTIVE TEMPERATURE REGULATION

(75) Inventors: Franck Cousin, Saint Brevin les Pins (FR); Willy Frederick, Clerac (FR); Pierre Kowalewski, Paris (FR); Didier Alo, Criquetot l'Esneval (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 299 days.

(21) Appl. No.: 13/000,537

(22) PCT Filed: Jun. 18, 2009

(86) PCT No.: PCT/FR2009/051167  
§ 371 (c)(1),  
(2), (4) Date: Dec. 21, 2010

(87) PCT Pub. No.: WO2010/007280  
PCT Pub. Date: Jan. 21, 2010

(65) Prior Publication Data  
US 2011/0223293 A1    Sep. 15, 2011

(30) Foreign Application Priority Data

Jun. 25, 2008 (FR) .................................. 08 54215

(51) Int. Cl.  
A01K 43/00    (2006.01)

(52) U.S. Cl. ........ 426/231; 426/448; 426/524; 426/516; 426/582; 426/143; 264/40.1

(58) Field of Classification Search .................. 426/448, 426/231, 524, 516, 582; 425/143; 264/40.6, 264/28, 40.1  
See application file for complete search history.

(56) References Cited

U.S. PATENT DOCUMENTS

| 4,795,650 | A | | 1/1989 | Groobert |
| 5,549,921 | A | * | 8/1996 | Robinson et al. ............. 426/573 |
| 5,948,459 | A | * | 9/1999 | Telford ........................ 426/512 |

(Continued)

FOREIGN PATENT DOCUMENTS

| EP | 0 250 381 | 12/1987 |
| FR | 2 915 351 | 10/2008 |

OTHER PUBLICATIONS

International Search Report for PCT/FR2009/051167, mailed Feb. 10, 2010.

*Primary Examiner* — Drew Becker  
*Assistant Examiner* — Preston Smith  
(74) *Attorney, Agent, or Firm* — Christopher J. Cronin

(57) ABSTRACT

The subject of the invention is a method for shaping at least one food product by cryoextrusion, the extruder being provided with a double-walled jacket surrounding the extrusion screw and through which jacket a coolant flows, this jacket consisting of a single module or several independent modules, the cryoextrusion being temperature-regulated on the basis of a curve, determined for said product to be cryoextruded, representing, plotted on the X-axis, the difference D between the actual temperature of the product and the desired temperature setting for the product at the exit and, plotted on the Y-axis, the setting to be applied for the gas temperature at the exit of the module or modules, the curve being split into three linear zones: an abrupt (steep-slope) zone, around a difference D close to 0, surrounded by two quasi-plateau zones.

14 Claims, 3 Drawing Sheets

U.S. PATENT DOCUMENTS

| | | | |
|---|---|---|---|
| 6,340,487 B1 * | 1/2002 | Wenger et al. | 426/231 |
| 2003/0056657 A1 * | 3/2003 | Warner et al. | 99/353 |
| 2003/0211192 A1 | 11/2003 | Bakker et al. | |
| 2005/0048179 A1 * | 3/2005 | Alexander et al. | 426/516 |
| 2005/0132902 A1 | 6/2005 | D'Arcangelis et al. | |
| 2006/0283196 A1 * | 12/2006 | Rosenbaum et al. | 62/63 |

\* cited by examiner

METHOD FOR SHAPING A FOOD PRODUCT BY CRYOEXTRUSION EMPLOYING PREDICTIVE TEMPERATURE REGULATION

CROSS-REFERENCE TO RELATED APPLICATIONS

This application is a §371 of International PCT Application PCT/FR2009/051167, filed Jun. 18, 2009, which claims §119 (a) foreign priority to French application 0854215, filed Jun. 25, 2008.

The present invention relates to the field of the food industry and more particularly to a cold food product extrusion method for shaping said food products.

BACKGROUND

1. Field of the Invention

Hereinafter, the terms extrusion, cryoextrusion, cold extrusion and extruder as an adjective are used indifferently; these terms are perfectly known to those skilled in the art, some also use the expression "mixer" or "screw mixer".

2. Related Art

The shaping of food products has become a major issue for the industry in recent years. Consumers are increasingly demanding food products in portions, in original and varied shapes, so that they can easily apportion the quantities that are necessary for their meal and that also arouse gustatory desire. Another issue is to provide food professionals with apportioned products that can easily be used.

To meet this requirement, the industry has various techniques available, but which are not, however, fully satisfactory.

The simplest technique is the hollow punch or mold technique. The major drawback in this technique is that it does not make it possible to obtain complex shapes nor does it make it possible to use a liquid raw material, and it is a major source of waste which is difficult to reuse given the increasingly strict food standards.

The technique that is commonly used is the "pellet machine", consisting of two counter-rotating hollow cylinders between which a food paste, previously deep frozen or not, is poured, which then leaves in the form of "pellets", which can then be subjected to a freezing step. Such a method is used to make deep frozen food products of the "block" soup, portioned spinach, and other such types. The products obtained in this way are not satisfactory because not only do they have an unpleasing external appearance, requiring the use of opaque packages, but they also have a shape that is limited by the geometry of the machine which makes it possible to produce only pellets, and in no circumstances play shapes for example for children. Finally, it is not possible to accurately apportion the quantity of food product for the "pellets". The product losses are also significant.

Another technique that can be used is the extrusion of food products, in particular cold extrusion. Many food products can be extruded, whether solid or semi-solid, such as, for example, doughs for bread, savory biscuits or products, starches, vegetables, meats, ice cream, chocolate, soft sweets, chewing gum, fruit jelly, caramel, cereals, vegetable proteins, casein, cheese spread, foods for animals, etc., this list obviously not being exhaustive.

Conventionally, an industrial extruder consists of a long cylinder comprising at least one extrusion screw on the inside, with a feed hopper at one of its ends and an output nozzle at its other end. Generally, the extrusion screw is driven by a rotary motor, the rotation speed of which is controlled by a frequency adjuster.

In low-temperature extrusion, either the products are cooled or even frozen upstream of the extrusion step, as described, for example, in the document U.S. Pat. No. 4,795,650, or the products are directly cooled or even frozen in the extruder itself. In the latter case, either the cooling is done from the outside of the extruder, that is to say that a coolant circulates around the body of the extruder, for example brine, ammonia, glycolated water, liquid nitrogen, carbon dioxide, as described, for example, in US 2003/0211192 or US 2005/0132902; or the cooling is done by direct contact by injecting a coolant into the extruded product, as described, for example, in the documents EP-0 250 381 or US-2006/0283196.

According to one of the known cryoextrusion versions, the circulation means for a coolant consists of a double jacket surrounding the extrusion screw and in which circulates a coolant. The double jacket can consist of a number of independent modules interlinked by ducts of pipe type, enabling the coolant to pass from one module to another, the extrusion screw or screws being positioned in the cylinder formed by the association of the modules of the double jacket, each module being provided with its coolant intake and its gas extraction, and in some cases, some of the modules are connected in gas circulation series, in pairs.

These methods, theoretically attractive, are difficult to exploit industrially. In practice, they have the major drawback of blocking the extruder screw or screws by too rapid a drop in the temperature of the product. In practice, when the temperature of the extruded food product drops too rapidly, the viscosity of the product increases very rapidly and leads to an increase in the torque on the screw or screws and therefore in the motor current, thus triggering the motor's thermal trip and therefore immobilizing said motor. For this reason, this type of cold extrusion method is difficult to use as such in industry to shape food products that have a high viscosity.

Moreover, it should be indicated that controlling the output temperature of the products in practice proves very difficult.

Since the temperature of the product is not easy to control, the output product tends to gradually become too cold, with the consequence of hardening the product and risking jamming the machine, whereas, if the modules are too hot, it is difficult to obtain the desired temperature.

The current situation is characterized by the fact that it is the operator who almost empirically manages the situation: he measures the temperature of the products at the shaping output and imprecisely either undertakes no action or increases the injection of cryogen to try to make up for an insufficiently low output temperature.

SUMMARY OF THE INVENTION

Thus, the technical problem that the present invention proposes to address is the provision of an industrial method making it possible to confer a sufficiently solid texture on food products that are initially liquids, semisolids and/or solids, in order to perform a shaping of the latter into calibrated portions that also have a satisfactory esthetic appearance, and which method provides good control of the temperature at which the products are obtained.

As will be seen in more detail hereinbelow, this problem has been resolved by the present invention, which proposes an improvement to the cold extrusion method, also called cryoextrusion.

For this, the proposed method is based on the following approach:
- a data acquisition and processing system acquires and manages the gas temperatures at the output of the module or modules and is able to control the modification of the injection or injections of cryogen (for example, liquid nitrogen) via solenoid valves or control valves;
- the system calculates the difference between the actual temperature of the product and the temperature setpoint desired for the product at the equipment output. Depending on the sign of this result and its absolute value, the system determines the temperature setpoints to be injected into the temperature regulation loops of the cooling modules.

These setpoints are calculated relative to a model which is programmed in the system.

As will be better visualized using FIG. 1 appended hereafter, the curve represents, on the X axis, the difference $\Delta$ between the actual temperature of the product and the temperature setpoint desired for the product at the output, and, on the Y axis, the setpoint to be applied for the temperature of the gases at the output of the module or modules, and is organized in three linear regions: a very abrupt region around a difference $\Delta$ close to 0, surrounded by two much more gradual regions, almost flat, the curve relating to a case where the cryogen is liquid nitrogen;

The more negative the difference $\Delta$ is (the product is too cold), the less the modules have to be cooled (the system will demand a gas temperature setpoint close to 0° C.); the more the difference tends toward 0, the more the temperature of the gases sought is the equilibrium temperature (in the exemplary curve given here, close to −120° C., a value at which, for a given product, at a given flow rate, the heat exchange will bring the product to its desired forming temperature); the more positive the difference is (the product is insufficiently cold), the more the injection of cryogen must be boosted (the system will require a gas temperature setpoint close to −196° C.).

It will be clearly understood from reading FIG. 1 that the "almost flat regions" mentioned hereinabove are determined for each case of equipment, product, etc., but they should be understood to be straight portions extending over a few degrees Celsius to a few tens of degrees Celsius, not more, and terminating clearly with the abrupt portion (almost vertical) extending around 0.

The equilibrium temperature is determined during preliminary tests.

As an illustration, it is set by the following method:
- depending on the composition of the product, its freezing temperature can be calculated,
- then, depending on the texture obtained in preliminary tests, if the texture is too soft, this temperature is lowered, and if the texture is too hard, the temperature is increased,
- for example, it is known that, for a given product, its freezing temperature or the desired temperature in the case of cooling is −4° C., so we will therefore encode this value in preliminary tests and leave the system to regulate to obtain −4° C. At each 0.5° C. level below 0° C., the texture is checked, and the equilibrium temperature of the gases that is most appropriate to the desired result is encoded.

The adopted structure still allows for a return to the equilibrium point: the more the temperature of the product deviates from the setpoint, the stronger the induced reaction becomes.

The subject of the present invention is therefore a method for shaping at least one food product by cryoextrusion using an extruder comprising at least one extrusion screw driven by a motor and a nozzle at the output of said at least one extrusion screw, the extruder being provided with a double jacket surrounding the extrusion screw and in which circulates a coolant, the double jacket consisting of one or more independent modules, each module being provided with its coolant intake and its gas extraction, characterized by the use of the following measures:
- a data acquisition and processing system is available that is capable of acquiring the temperature of the product at the screw output, of acquiring and managing the gas temperatures at the output of the module or modules and of controlling modifications to the injection or injections of coolant into one or more of said modules;
- a curve has been determined and programmed beforehand in said system, the curve being determined for said product to be extruded, representing, on the X axis, the difference $\Delta$ between the actual temperature of the product at the output and the temperature setpoint desired for the product at the output, and, on the Y axis, the setpoint to be applied for the temperature of the gases at the output of the module or modules, the curve being organized in three linear regions: an abrupt region around a difference $\Delta$ close to 0, surrounded by two almost flat regions;
- said system calculates the difference $\Delta$ between the actual temperature of the product at the screw output and the temperature setpoint desired for the product at the screw output;
- and, depending on the sign of the difference $\Delta$ and its absolute value, said system determines on said curve the temperature setpoint or setpoints to be injected into the temperature regulation loop or loops of the cooling module or modules.

DETAILED DESCRIPTION OF THE INVENTION

Figure 1:
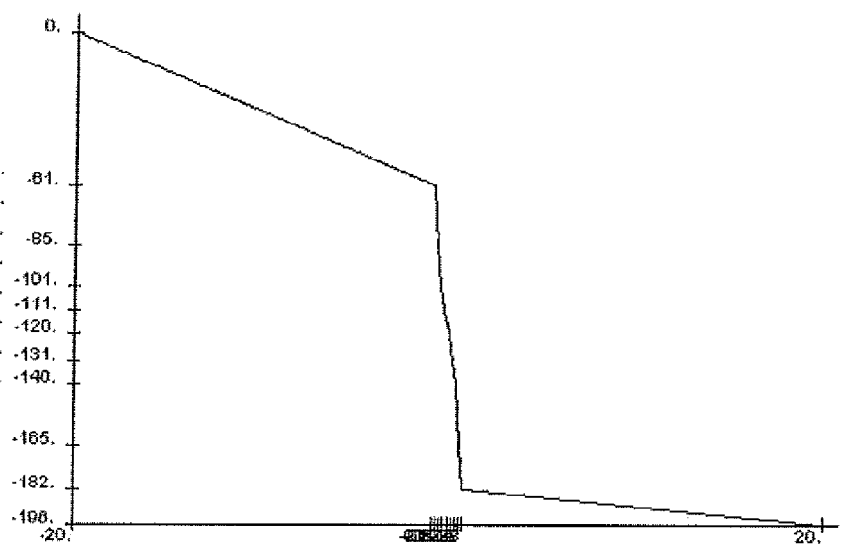
FIG. 1 is a graph of the setpoint to be applied for the temperature of the gases at the output of the module or modules versus the difference $\Delta$ between the actual temperature of the product and the temperature setpoint desired for the product at the output.

According to one advantageous embodiment of the invention, for finer regulation, but also to adapt very easily to a change of product, two multiplying coefficients are applied to the curve of the preceding product to obtain the new curve which applies to the new product to be processed: a first coefficient "a" is applied to the difference $\Delta$, a second multiplying coefficient "b" is applied to the injected setpoint for the regulation of the temperatures of the gases.

These coefficients are typically determined by trial and error during preliminary tests, for example by their value in steps of 5% at a time. They are adjusted to best adhere to the ideal forming or temperature lowering temperature.

Within the meaning of the present invention, the term "cryoextrusion" should be understood to mean an extrusion method performed at low temperature, preferably around the freezing point of the food product, more preferably just below the starting freezing point of the food product, even more preferably between 0.1° C. and 1° C., or even 2° C., below the freezing point of the food product. It is obvious that the temperature used to employ the cryoextrusion method according to the invention depends on the composition of the product to be extruded. In practice, it is well known to those skilled in the art that the starting freezing temperature of a food product varies according to its composition, in particular according to its water and lipids composition. The more water-rich the food product is, the more the temperature needed to shape it will converge toward the solidification point of water, that is to say, 0° C. If, moreover, a food product is, for example, rich in butter, the melting temperature of which is close to 30° C., a temperature of between 0° C. and 30° C., varying according to the percentage of water and other constituents, will be sufficient for its shaping.

Within the meaning of the present invention, the term "shaping" should be understood to mean the action of conferring a determined shape on a food product. The cryoextrusion method according to the invention, by bringing the extruded food product to a temperature slightly below its starting freezing point, makes it possible to confer on the product a texture that is both flexible enough for a shaping, and solid enough for the shaping to be retained at the output of the extruder. This shaping is performed using an extruder nozzle, having a predetermined shape and being placed directly at the output of the extrusion screw. The most commonly used nozzle shapes are stars, squares, circles, triangles, numerals, letters and others including make-believe characters, but those skilled in the art will be able to imagine any other shape likely to satisfy the demand of the final customer.

Within the meaning of the invention, the expression "double jacket" should be understood to mean the combination of a first, inner jacket enveloping the extrusion screw or screws, one side of which is in direct contact with the food product, with a second, outer jacket concentric to the first so that a space is provided between the first and the second jackets. Thus, the space provided between the two jackets allows for the circulation of a coolant. This means that the coolant is not in direct contact with the food product, but in indirect contact via the inner jacket. Generally, the double jacket includes an inlet orifice, via which the coolant is introduced, and an outlet orifice via which the coolant is evacuated. Advantageously, the coolant is recycled, either by reinjection into the double jacket, or by direct injection onto the food product in the extruder's feed hopper.

The double jacket within the meaning of the invention may also consist of several independent modules interlinked by pipe-type ducts, allowing the coolant to pass from one module to another. In this particular embodiment, the extrusion screw or screws are placed in the cylinder formed by the association of the modules of the double jacket. Such an embodiment presents the advantage of being able to rapidly adapt the size of the extruder according to the food product or the quantity of food product to be extruded.

Advantageously, the surface of said inner double jacket in contact with the food product is maintained at a temperature less than or equal to approximately −90° C. In practice, the Applicant, during its research, has been able to determine that maintaining the surface of the jacket in contact with the food product at a temperature below approximately −90° C. makes it possible to obtain a "zero adhesion" phenomenon. In other words, at temperatures below −90° C., the food product no longer adheres to the surface of the jacket. This type of phenomenon cannot be observed with the appliances of the prior art that include mechanical refrigeration, the temperatures reached not being low enough. These appliances must therefore deal with a problem of adhesion of the food product to the surface of the double jacket. Maintaining the surface of the inner double jacket in contact with the food product at a temperature below or equal to approximately −90° C. therefore constitutes a real advantage compared to the prior art.

Preferably, said coolant is liquid nitrogen which makes it possible to easily maintain the surface of the double jacket in contact with the food product at a temperature below or equal to −90° C.

Preferably, the extruder comprises two extrusion screws. Advantageously, the extruder comprises two counter-rotating extrusion screws.

Figure 2:
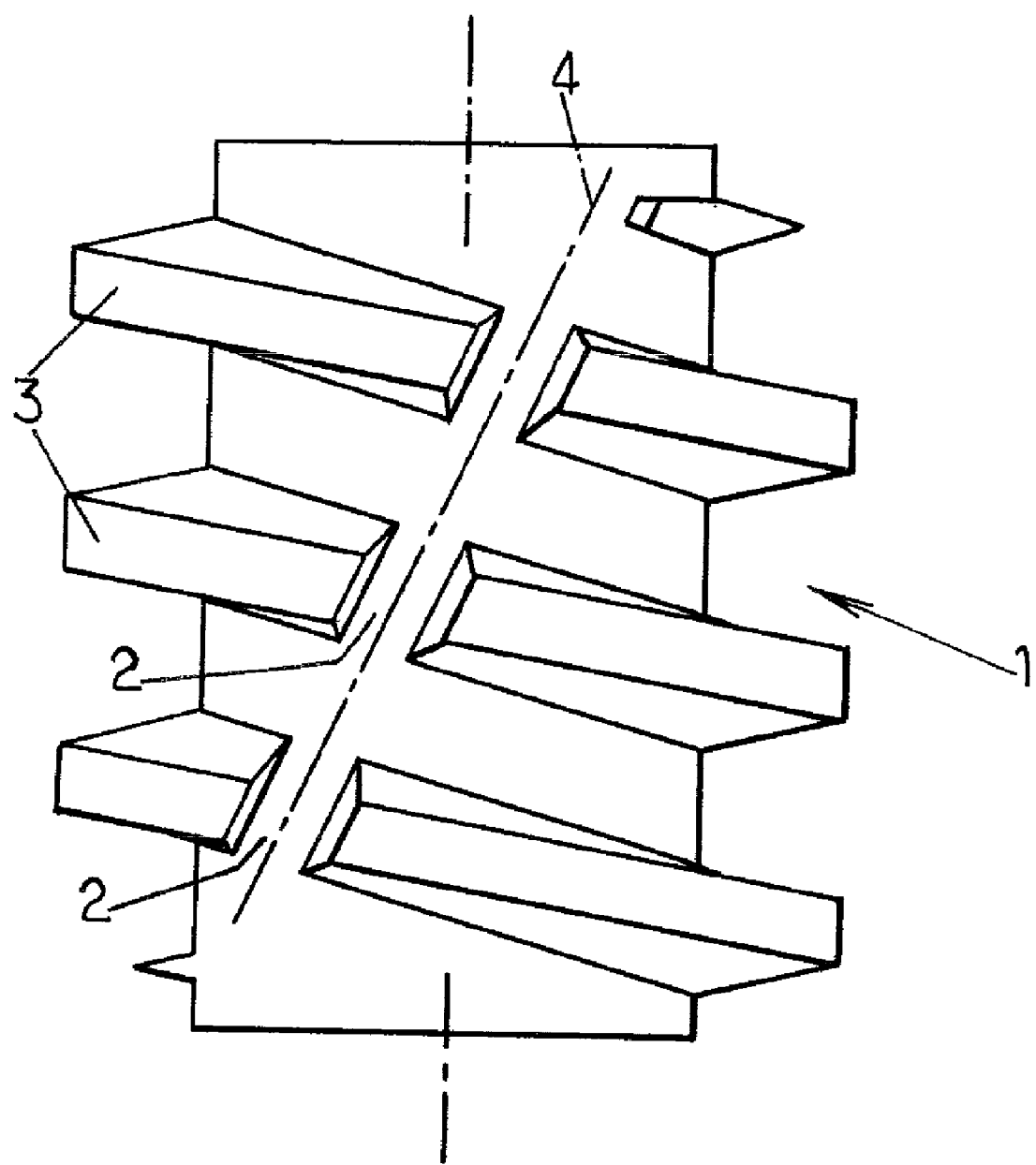
FIG. 2 is a side elevation view of a portion of a mixing machine.

Advantageously, the extrusion screw or screws have a particular geometry, alternating portions of the "Archimedes" type, enabling the food product to advance toward the output of the extruder, and portions of the "mixing machine" type, enabling the food product to be mixed so that a good homogenization of the product inside the extruder is obtained. Similarly, the mixing of the food product allows for a better distribution of the cold within the product. Generally, the extruder comprises two counter-rotating extrusion screws including at least one portion of the Archimedes type and at least one portion of the mixing machine type. A screw that is particularly suited to implementing the invention may include a first mixing machine portion then an Archimedes portion, or even a first Archimedes portion followed by a mixing machine portion. Another screw suited to the invention may include several alternating Archimedes/mixing machine portions, and it is for those skilled in the art to choose the screw best suited to the extruded food product. Advantageously, the mixing machine screw portion has a screw pitch that is reversed relative to the Archimedes-type portion. A nonlimiting and simply illustrative diagram of a mixing machine portion is given in FIG. 2: the mixing machine portion (1), which is preferably added to the end of each screw and with reversed pitch, includes notches (2) through which the food product must pass. Each thread (3) of this mixing machine portion (1), advantageously of constant pitch, has notches (2), helically distributed, so said notches (2) form between them at least one helix (4), the pitch of which is reversed relative to that of the thread (3) of the mixing machine portion (1). The mixing machine portion referred to above is usually added and fixed by any known means to the end of an extrusion screw, but it may possibly form part of the screw itself.

Similarly, the screws used may optionally include a compression region, in other words, for example, a region of gradual reduction of the screw pitch or of increase in the diameter of the screw shaft (for example, a screw shaft diameter increasing with constant screw pitch).

In one embodiment of the invention, the method also includes a step for cutting the extrudate using a cutting means placed directly at the output of the nozzle. Using this cutting means, the operator can, by varying the rate of cutting and/or the extrusion speed, prepare calibrated portions of food products. If the cutting rate is increased, the portions will be smaller, and if the cutting rate is reduced, the portions will be larger. A cutting means within the meaning of the invention may notably be a cutting wire, a blade, a cleaver, scissors, a blade taper or any other means capable of producing a clean and quick cut of the shaped food product. A preferred cutting means is a rotary knife whose blade brushes across the extruder's output nozzle.

Alternatively, the method as described above may consist in the simultaneous shaping of two food products by "coextrusion". Coextrusion is of particular interest in coating food products or in the production of food products resulting from the combination of several food products, for example of different layers so as to obtain esthetically attractive individual portions.

Particularly advantageously, the invention also provides for the recording of the extrusion-related setting parameters. In practice, each food product requires particular extruder settings ("recipes"), and these data can be recorded so that the operator only has to indicate to the computer which product he wants to extrude for the extruder to be automatically set accordingly. Two types of parameter can in particular be recorded:
- the parameters specific to the food product to be extruded, namely, for example, the starting freezing temperature of the product, its enthalpy variation as a function of the temperature, which are in particular dependent on the water content of the product, the fatty matter content, etc., and
- the parameters specific to the extruder, namely, in particular, the number and the type of screws, the number and the type of double-jacket modules, the speed of rotation of the screw, etc.

The operator, having these data prerecorded, will now only have to configure the machine according to the characteristics of this product.

The present invention targets, for example, the food products chosen from vegetable purées, vegetable timbales, vegetable rounds and cakes, chopped spinach, soups, veloutés, broths, stocks, sauces, prepared dishes, fish preparations, in particular fish sticks, preparations for crêpes, chopped meat, sausages, nuggets, deep frozen herbs, cheeses in portions, savory biscuits, cereals, fruit, compotes, sugared sauces and toppings, sherbet, ice creams and frozen desserts.

Figure 3:
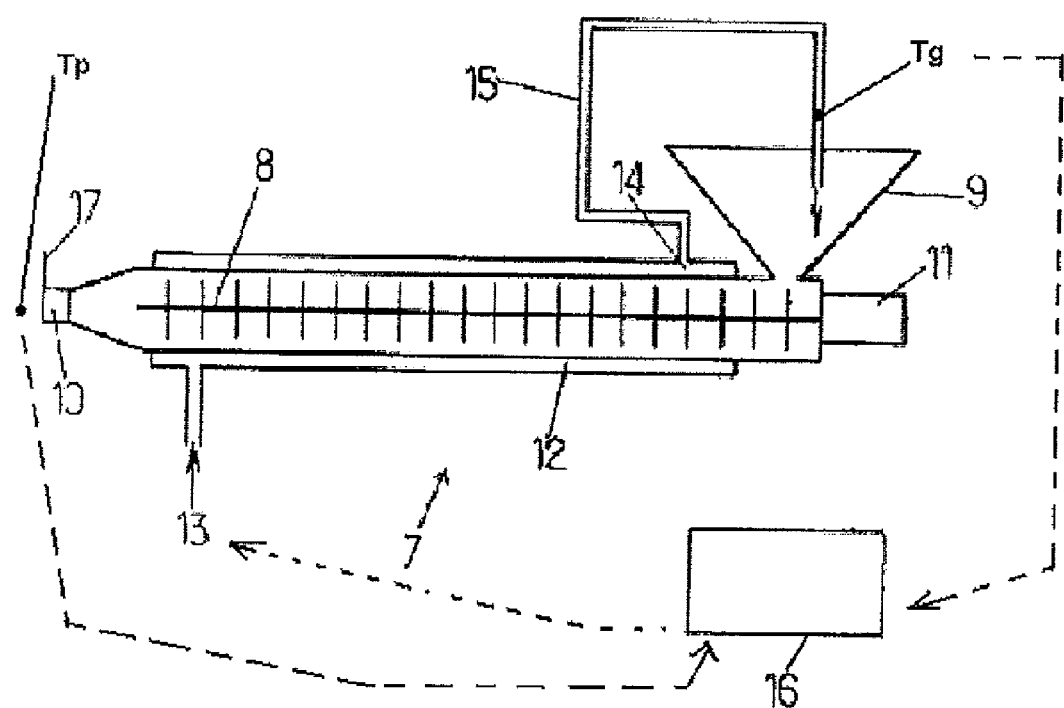
FIG. 3 is a schematic of a particular installation according to the invention.

FIG. 3 is a diagram of a particular installation according to the invention, seen in cross section. The installation (7) consists of an extrusion screw (8), a feed hopper (9) and an output nozzle (10). The extrusion screw (8) is driven by a motor (11). The installation (7) also includes a double jacket (12) enveloping the extrusion screw (8). This double jacket includes an inlet orifice (13) for the coolant, said coolant circulating all along the double jacket around the extrusion screw as far as the outlet orifice (14) linked to a duct (15) enabling, if desired, the coolant to be reinjected in the feed hopper (9) onto the food product, thus allowing for the coolant to be recycled.

The installation is, moreover, provided with a data acquisition and processing system 16 that is capable of acquiring the temperature Tp of the product at the screw output, of acquiring and managing the gas temperatures Tg at the output of the module or modules and of ordering modifications to the injection or injections of coolant into one or more of said modules according to the difference Δ between the actual temperature of the product at the output and the temperature setpoint desired for the product at the output and to the curve established for the product concerned, in accordance with the present invention.

The present invention has been successfully applied to shaping goat's milk cream, cheese curd, or even creamed spinach, by adapting, in each case, by virtue of coefficients "a" and "b", the typical curve of FIG. 1, and it has thus been possible to obtain shapes that producing sites could not obtain by their previous production methods.

The curve of FIG. 1 has thus successfully been used to produce so-called soft or spreadable butter.

As is known, there are several methods for producing soft butter, including:
Dry fractionation.
Cryogenic tunnel crystallization.
Cryoextrusion crystallization.

As a reminder, dry fractionation consists in having fatty matter melted by heat, then, by slowly cooling it while stirring, crystallization of a portion of the molten mass is brought about. This portion includes the constituents of butter that have the highest melting points, said portion thus becomes solid and is then extracted by filtration. The two "fractions" obtained, called, in a misuse of language, "oleine" for the fluid fraction, and "stearine" for the solid fraction, may in turn be fractionated, and so on. It is then possible to produce an entire range of fractions with diverse characteristics, that can then be judiciously mixed to obtain products with given and desired characteristics.

Although theoretically highly attractive, these operations are, however, neither simple to perform in practice, nor perfectly known, nor mastered with regard to the composition and the actual rheological characteristics of the fractions obtained.

With regard to cryogenic tunnel crystallization, the more rapid the cooling speed, the more solid fatty matter will be formed. Numerous crystallization points are then formed leading to a multitude of fine and uniform crystals.

The remaining liquid fatty matter is then rich in short-chain and unsaturated fatty acids with low melting point. By this technique, a softer butter can be obtained, which is sought after in the production of winter butters.

When the cooling speed is slow, coarse crystals form which will give a firmer butter, sought after in the production of summer butters.

As for cryoextrusion, this makes it possible to control the temperature kinetics (rapid lowering and rapid raising again of the temperature of the butter). The use of liquid nitrogen allows for a rapid transfer of the frigories, and prevents the phenomena of sticking of the butter to the walls of the tunnels in the techniques that use a tunnel. The regulation system according to the present invention makes it possible to best manage the extrusion operation, but has also demonstrated a notable lowering of the consumption of liquid nitrogen per kilo of product produced, compared to the current cryogenic methods, in particular cryogenic tunnel crystallization, the consumption being divided by a factor ranging from 5 to 10 depending on the batches and conditions tested, a range which then is also in all cases considerably advantageous.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for shaping at least one food product by cryoextrusion, comprising the steps of:
    extruding a first food product through an extruder comprising at least one extrusion screw driven by a motor and a nozzle at the output of said at least one extrusion screw, the extruder being provided with a double jacket surrounding the extrusion screw and in which circulates a coolant, the double jacket consisting of one or more independent modules, each module being provided with a coolant inlet orifice receiving liquid coolant and a coolant outlet orifice allowing gaseous coolant to exit the module;

acquiring a temperature of the first food product at the screw outlet with a data acquisition and processing system;

acquiring a temperature of coolant gas at the coolant outlet orifice with the data acquisition and processing system;

injecting liquid coolant into one or more of said modules, a difference $\Delta$ being defined as the difference between an actual temperature of the first product at the output and a temperature setpoint desired for the product at the output, wherein a first curve of a setpoint for the temperature of the coolant gas at the coolant outlet orifice versus $\Delta$ is programmed in said data acquisition and processing system, the first curve being organized in first and second regions connected with and surrounding a third region, the first and second regions being almost flat, the third region being almost vertical and extending through values of $\Delta$ close to 0;

calculating the value of $\Delta$;

depending on the sign of the difference $\Delta$ and its absolute value, said data acquisition and processing system determines on said first curve the coolant gas temperature setpoint; and controlling the temperature of the gaseous coolant at the coolant outlet orifice based upon the coolant gas temperature setpoint through said injection of liquid coolant into said one or more modules.

2. The method of claim 1, wherein the coolant is liquid nitrogen.

3. The method of claim 2, wherein a surface of said double jacket in contact with the first food product is maintained at a temperature less than or equal to approximately −90° C.

4. The method of claim 2, wherein said data acquisition and processing system controls the temperature of the gaseous coolant at the coolant outlet orifice using a regulation logic according to which:
the more negative $\Delta$ is, the more the system requires the gaseous coolant temperature setpoint close to 0° C.;
the more $\Delta$ tends toward 0, the more the system requires the gaseous coolant temperature setpoint to be close to a previously determined gaseous coolant temperature setpoint; and
the more positive $\Delta$ is, the more the system requires the gaseous coolant temperature setpoint close to −196° C.

5. The method of claim 1, wherein the first food product at the output of the extruder is at a temperature of approximately 0.1° C. to approximately 1° C. below a freezing point of the first food product.

6. The method of claim 1, wherein:
in order to switch from cryoextrusion of said first product to cryoextrusion of a new and different product, first and second multiplying coefficients are applied to the first curve thereby obtaining a second curve associated with the new and different product to be cryoextruded;
a first multiplying coefficient a is applied to $\Delta$; and
a second multiplying coefficient b is applied to the gaseous coolant temperature setpoint.

7. The method of claim 1, wherein the extruder comprises two extrusion screws.

8. The method of claim 1, further comprising the step of cutting the extruded first food product using a cutting device placed directly at the output of the nozzle, said cutting device being used to cut the shaped first food product into calibrated portions.

9. The method of claim 1, wherein two food products are simultaneously shaped by coextrusion.

10. The method of claim 1, further comprising the step of recording setting parameters relating to the extrusion for said first food product and one or more additional food products in a supervision device, so that an operator only has to indicate to said supervision device which product he wants to extrude for the extruder to be automatically set accordingly.

11. The method of claim 1, wherein the first food product is selected from the group consisting of: vegetable purées, vegetable timbales, vegetable rounds, vegetable cakes, chopped spinach, soups, veloutés, broths, stocks, sauces, prepared dishes, fish preparations, fish sticks, preparations for crêpes, chopped meat, sausages, nuggets, deep frozen herbs, cheeses in portions, savory biscuits, cereals, fruit, compotes, sugared sauces, sugared toppings, sherbet, ice creams, and frozen desserts.

12. The method of claim 7, wherein the extruder comprises two counter-rotating extrusion screws.

13. The method of claim 12, wherein the extruder comprises two counter-rotating extrusion screws including at least one portion being of the Archimedes type and at least one portion of the mixing machine type.

14. The method of claim 8, wherein the cutting device is selected from the group consisting of a cutting wire, a blade, a cleaver, scissors, a blade taper, and a rotary knife.

* * * * *